United States Patent [19]
Kitchin

[11] 3,731,774
[45] May 8, 1973

[54] ONE WAY ROLLER CLUTCH WITH RESILIENT RETAINER

[75] Inventor: Oscar G. Kitchin, Clinton, Ohio

[73] Assignee: General Motors Corporation, Detroit, Mich.

[22] Filed: Apr. 10, 1972

[21] Appl. No.: 242,424

[52] U.S. Cl. ................................................. 192/45
[51] Int. Cl. ........................... F16d 15/00, F16d 41/06
[58] Field of Search ..................... 192/27, 38, 44, 45; 188/82.84

[56] References Cited

UNITED STATES PATENTS 3,064,777  11/1962  Boedigheimer et al. ................ 192/45
3,537,554  11/1970  Elmore et al. ........................... 192/45

Primary Examiner—Allan D. Herrmann
Attorney—J. L. Carpenter et al.

[57] ABSTRACT

A one way roller clutch has a resilient retainer of generally annular form which holds the clutch rollers in unit handled relationship with the outer clutch race and which also biases the clutch rollers toward a position of wedging engagement between the clutch races.

3 Claims, 4 Drawing Figures

Patented May 8, 1973 3,731,774

ONE WAY ROLLER CLUTCH WITH RESILIENT RETAINER

This invention relates generally to one way clutches and more particularly to one way roller clutches.

In the past, one way roller clutches have generally included a rigid cage member with a number of circumferentially spaced pockets which individually received the clutch rollers. Individual accordion pleated springs mounted on the cage adjacent each pocket engaged each of the rollers biasing them toward a position of wedging engagement between cams on the outer race and a cylindrical surface on the inner race so that the clutch would immediately engage in response to relative rotation between the races in one direction. The spring reaction forces on the cage were grounded on the outer race usually by reaction ears which engaged cooperating shoulders on the outer race. A unit handled relationship between the cage, rollers, springs and the outer race was often provided to constitute a subassembly for incorporation into a more comprehensive machine or mechanism which provided the inner race by a shaft or the like.

The object of this invention is to generally improve upon such prior one way roller clutches by reducing the number of parts, simplifying the structure and increasing the load capacity.

Another object of this invention is to improve upon such prior one way roller clutches by eliminating the cage and a number of individual springs and replacing them with a single resilient retainer.

Another object of this invention is to provide a unit handled subassembly of race and rollers which is adapted to bias the rollers toward a position of wedging engagement when the subassembly is added to a second race wherein a single resilient retainer is the only other part required.

A feature of this invention is that the reaction of the rollers on the resilient retainer is grounded directly on the race without an intervening member such as the cages used in prior one way roller clutches.

Another feature of the invention is that it provides a unit handled subassembly which provides a complete roller clutch simply by assembling the subassembly to a shaft and yet does not require a structurally complicated cage and number of individual springs as did prior one way roller clutches.

Another feature of this invention is a higher load capacity for a given envelope size because more rollers can be fitted into the annular space between the races due to the elimination of the cage and individual accordion pleated springs.

Another feature of this invention is that many parts may be simple, inexpensively stamped or drawn parts.

Other objects and features of this invention will become apparent to those skilled in the art as the disclosure is made in the following detailed description of preferred embodiments of the invention as illustrated in the accompanying sheet of drawings in which.

Figure 1:
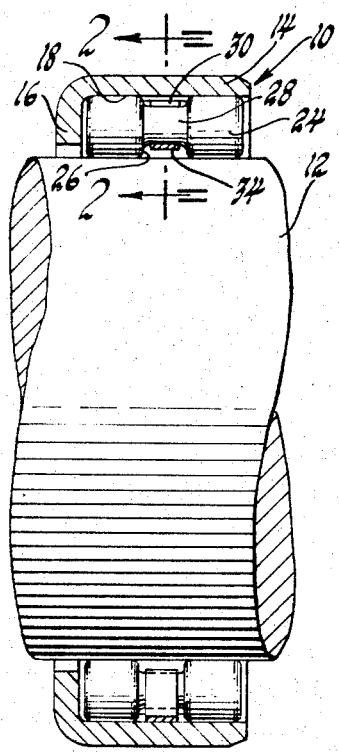
FIG. 1 is an elevation partially in section of a one way roller clutch in accordance with this invention.

Referring now to the drawings and more specifically to FIG. 1, the roller clutch of this invention is illustrated as a unit handled subassembly 10 in combination with a cylinder shaft 12 which provides the inner race for the clutch. The subassembly 10 comprises an outer race 14 which can be drawn from flat stock into a cup having an integral flange 16 and an inner peripheral surface 18 of the required shape having cams 20 and radial reaction shoulders 22. See FIG. 4. The subassembly 10 further includes rollers 24 each having a circumferential groove 26 forming a central waist 28 of reduced diameter and a resilient retainer 30. The resilient retainer 30 is easily fabricated from a strip of spring tempered steel bent to a generally sinuous form having crests 32 interconnected with troughs 34 and wound into an annular form. The ends of the wound strip may be suitably secured in any manner such as by welding overlapping portions as indicated at 36 in FIGS. 2 and 3.

Figure 2:
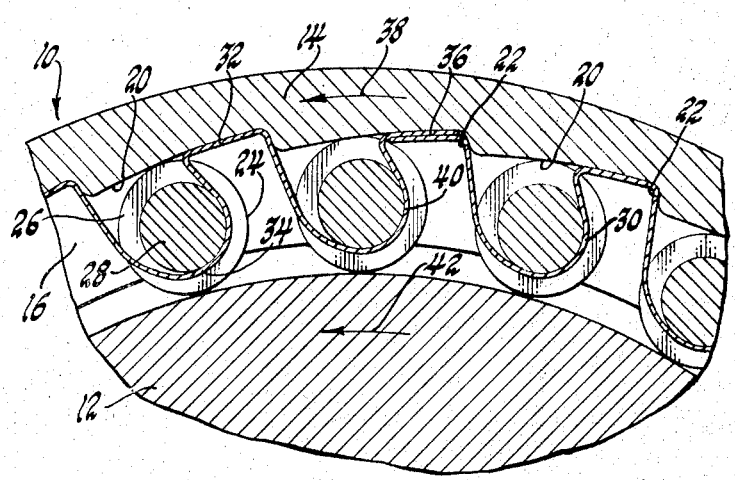
FIG. 2 is a section taken substantially along the line 2—2 of FIG. 1 and looking in the direction of the arrows.
Figure 3:
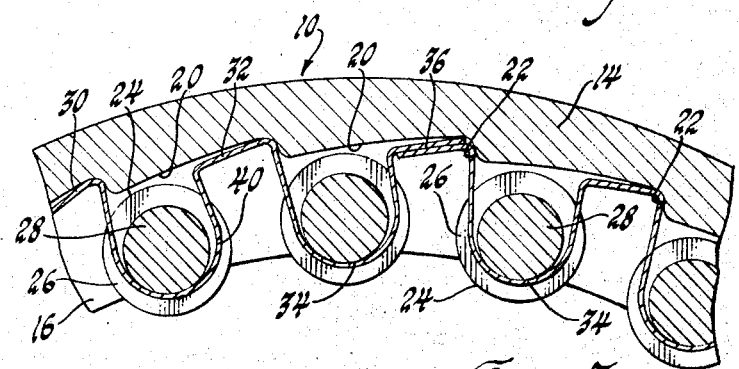
FIG. 3 is a view similar to FIG. 2 showing the unit handled subassembly of this invention with the inner race or shaft of the clutch removed.
Figure 4:
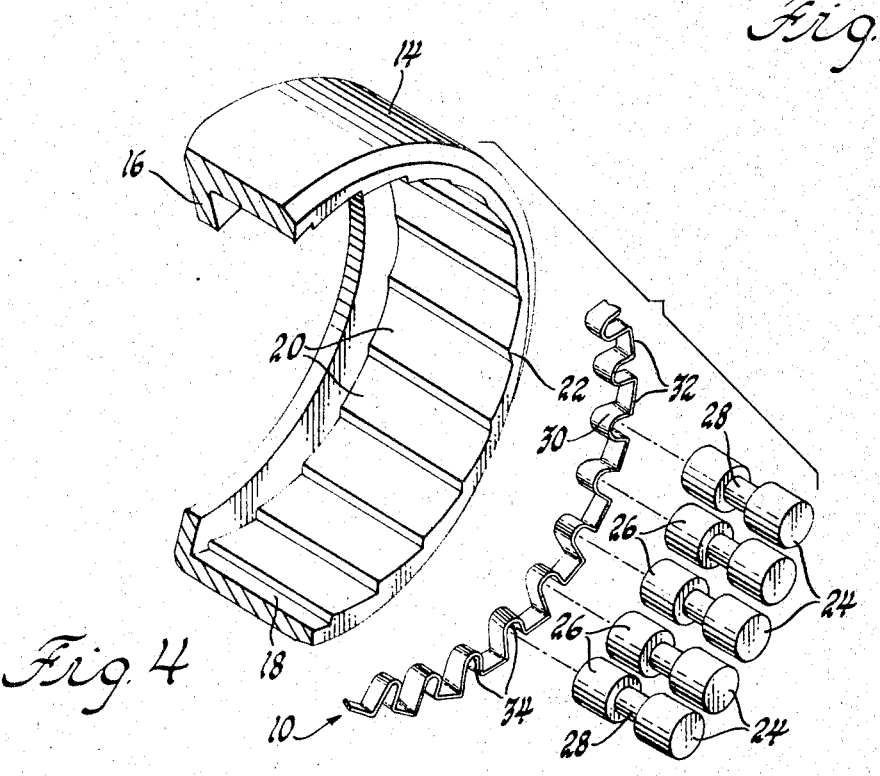
FIG. 4 is an exploded perspective view of the subassembly shown in FIG. 3.

Referring now to FIGS. 3 and 4, the unit handled subassembly 10 is assembled by nesting the central waists 28 of the rollers 24 in the troughs 34 of the resilient retainer 30 and then inserting the retainer 30 and nested rollers 24 axially into the cupped outer race 14 with corners of square shaped crests 32 aligned with the corners formed between the cams 20 and the reaction shoulders 22. The completed subassembly 10 is shown in FIG. 3 prior to assembly on the shaft 12 and the resilient retainer 30 is thus in an unflexed state. In the unflexed state, the square crests 32 have their circumferential portions spaced from the cams 20 except near the corners formed with the reaction shoulders 22 on the outer race 14. The troughs 34 which are interconnected with the crests 32 are disposed in the grooves 26 of the rollers and looped around the central waists 28. The waists 28 are thus disposed between the troughs 34 and the cams 20 thereby holding the rollers in assembly with the outer race 14. The spring retainer 30 is so formed that when the subassembly 10 is combined with an inner race such as shaft 12 shown in FIG. 2 the resilient retainer 30 is stressed by the rollers 24 being forced down the cams 20 slightly toward their associated reaction shoulders 22. In the stressed condition, the circumferential portions on the crests 32 abut the cams 20 and the radial legs 40 of the retainer 30 remote from the reaction shoulders 22 are resiliently deformed toward the reaction shoulders 22. This stressed condition causes the resilient retainer 30 to react against the shoulders 22 and the rollers 24 preventing rotation of the resilient retainer 30 with respect to the outer race 14 and also biasing the rollers 24 toward a position of wedging engagement between the cams 20 and the cylindrical surface of the shaft 12.

The one way roller clutch of this invention provides a free-wheeling operation when the outer race 14 is rotated relative to the shaft 12 in the direction indicated by the arrow 38 in FIG. 2. In the free-wheeling mode of operation, the drag on the rollers 24 is sufficient to overcome the bias of the resilient retainer 30. Relative rotation in the opposite direction as indicated by the arrow 42, however, is immediately prevented by the bias of the resilient retainer 30 which wedges the rollers 24 between the cams 20 and the cylindrical surface of the shaft 12.

I wished it to be understood that I do not desire to be limited to the exact details of construction shown and described, for obvious modifications will occur to a person skilled in the art.

I claim:
1. The combination comprising
a race member having a peripheral surface which includes a plurality of circumferentially spaced cams and a corresponding number of generally radial reaction shoulders associated with said cams,
a plurality of rollers each having a circumferential groove forming a central waist of reduced diameter, and
a generally annular resilient retainer having trough portions and crest portions, one said portions engaging said shoulders on said race member and the other said portions looping around said waists on said rollers with said waists disposed between said other portions and said race member.

2. The combination comprising
a race member having a peripheral surface which includes a plurality of circumferentially spaced cams and a corresponding number of generally radial reaction shoulders associated with said cams,
a plurality of rollers each having a circumferential groove forming a central waist of reduced diameter, and
a generally annular resilient retainer wound from a flat spring metal strip bent to a generally sinuous form having trough portions and crest portions, one said portions engaging said shoulders on said race member and the other said portions being disposed in said grooves and looped around said waists on said rollers with said waists disposed between said other portions and said race member.

3. In a one way roller clutch, the combination comprising
a race member having a peripheral surface which includes a plurality of circumferentially spaced cams and a corresponding number of generally radial reaction shoulders individually associated with each of said cams respectively,
a corresponding number of rollers engaging each of said cams respectively,
a circumferential groove in each of said rollers forming a central waist of reduced diameter spaced from said cams, and
a generally annular resilient retainer consisting of interconnected trough portions and crest portions, one said portions engaging said shoulders on said race member and the other said portions being disposed in said grooves with said waists on said rollers disposed between said other portions and said race member, said other portions engaging said waists and biasing said rollers into engagement with said cams in a direction away from said shoulders.

* * * * *